United States Patent
Krüger et al.

(10) Patent No.: US 6,896,508 B2
(45) Date of Patent: May 24, 2005

(54) MOLD CLOSING DEVICE FOR INJECTION MOLDING MACHINES

(75) Inventors: Jens Krüger, Erlangen (DE); Rudolf Kastel, Nürnberg (DE)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 10/399,005

(22) PCT Filed: Sep. 12, 2001

(86) PCT No.: PCT/DE01/03533

§ 371 (c)(1),
(2), (4) Date: Apr. 10, 2003

(87) PCT Pub. No.: WO02/30650

PCT Pub. Date: Apr. 18, 2002

(65) Prior Publication Data

US 2004/0013765 A1 Jan. 22, 2004

(51) Int. Cl.[7] .............................................. B29C 45/17
(52) U.S. Cl. ...................................... 425/589; 425/595
(58) Field of Search ................................. 425/589, 595

(56) References Cited

U.S. PATENT DOCUMENTS

| | | | | |
|---|---|---|---|---|
| 4,948,358 A | * | 8/1990 | Kushibe et al. ............. | 425/589 |
| 4,984,980 A | * | 1/1991 | Ueno ......................... | 425/595 |
| 5,249,951 A | * | 10/1993 | Leonhartsberger et al. . | 425/589 |
| 5,314,327 A | * | 5/1994 | Stein .......................... | 425/589 |
| 5,320,517 A | * | 6/1994 | Hirata et al. ................ | 425/589 |
| 5,328,346 A | * | 7/1994 | Kodric ........................ | 425/589 |
| 5,454,709 A | * | 10/1995 | Leonhartsberger et al. . | 425/589 |
| 5,511,963 A | * | 4/1996 | Hehl .......................... | 425/593 |
| 5,547,367 A | * | 8/1996 | Stein .......................... | 425/589 |
| 5,800,843 A | * | 9/1998 | Kappelmuller et al. ..... | 425/589 |
| 5,922,370 A | * | 7/1999 | Ziv-Av ....................... | 425/589 |

* cited by examiner

Primary Examiner—James P. Mackey
(74) Attorney, Agent, or Firm—Cohen, Pontani, Lieberman & Pavane

(57) ABSTRACT

A mold closing device for an injection molding machine for plastics includes a movable tool clamping plate having a first side opposedly oriented to a fixed tool clamping plate for cooperatively mating tool halves with the fixed tool clamping plate and having a second side distal from the fixed tool clamping plate. The movable tool clamping plate is mounted on a machine slide connected to a first and second guide shoe for traversing in an axial direction two guide rails associated with a respective edge of the movable tool clamping plate. The mold closing device also includes two bending elements. Each of the two bending elements connects a corner of the second side of the movable tool clamping plate to a guide shoe that is cooperating with one of the at least two guide rails. Each bending element is rigid perpendicular to the respective guide rail and includes a bending region that has a predeterminable elasticity in the axial direction to absorb a closing force.

8 Claims, 4 Drawing Sheets

MOLD CLOSING DEVICE FOR INJECTION MOLDING MACHINES

PRIORITY CLAIM

This application claims priority to application PCT/DE01/03533 filed on Sep. 12, 2001 in Germany and the following national applications: DE 100 50 966.5 filed on Oct. 10, 2000 in Germany and DE 101 20 171.0 filed Apr. 19, 2001 in Germany.

FIELD OF THE INVENTION

The invention relates to a mold closing device for injection molding machines for plastics wherein one of two tool halves is displaceable on a guide rail.

BACKGROUND OF THE INVENTION

The tool halves of injection molding machines are fastened to clamping plates or platen. One clamping plate is arranged in a rigid position and the other tool clamping plate on a machine slide. After of the tool halves are fastened to the molding machine and before the casting operation, the clamping plates are moved toward one another until the tool halves bear against each other. The molding machine closes completely by means of pressure, preferably hydraulic pressure.

A machine slide is guided by guide shoes which are attached at slide's base and run on rails located under the slide. When viewed in the running direction, two or more guide shoes may be arranged one behind the other on a rail.

When the tool halves close, deformations of the machine slide and/or of the guide rails occur. In worst case scenarios, irreparable damage to the tools halves may occur due to the high closing force.

It has been attempted to prevent such deformation using guide rails that are also attached laterally to the movable clamping plate. Such a rigid system is not readily suitable for reducing deformation forces. Further, this results in additional width of the machine, a factor which is to be avoided if possible.

DE 41 41 259 C2, equivalent to U.S. Pat. No. 5,314,327, discloses a mold closing device intended to provide precise and reliable carriage operation throughout the entire injection molding process. Therein, the movable tool clamping plate is located on the carriage such that it can be set or reset relative to the fixed tool clamping plate in all coordinates independently of the carriage with respect to the fixed tool clamping plate. The device includes a fixed tool clamping plate and a movable tool clamping plate that is movable on a carriage with two guide shoes and a flexurally rigid connecting part. Lateral guide roller that can be supported on the machine are arranged laterally on the carriage. The lateral guide rollers are adjustable via rotatable eccentric pins that are releasably fastened to the carriage.

The slide and the movable tool clamping plate, via at least three supports which are designed as bending compression members and via a vertical pivot pin displaceable transversely to the machine longitudinal axis, are connected such that they are movable relative to one another, there being an air gap between the slide and the movable tool clamping plate. The slide and the movable tool clamping plate are releasably fastened to one another by fastening screws which are arranged in the region of the marginal zones of the machine longitudinal axis and in the vicinity of the front edge and the rear edge of the movable tool clamping plate.

Publication DE 44 03 079 C1, equivalent to U.S. Pat. No. 5,547,367, discloses a mold closing device for plastic injection molding machines for accommodating large and heavy molds. Provided for the anti-friction guide is a load-compensating device which ensures reliable support in all the operating states and in which the anti-friction guide, in the static operating state, when the mold is closed, is protected from overloading by a load-limiting device. Roller recirculation shoes which are rotatable longitudinally and transversely in pendulum crosspieces are used as the anti-friction guide. The front pendulum crosspieces are mounted on the underside of the machine slide directly in sliding bearings, the rear pendulum crosspieces are mounted together with a supporting frame on an eccentric of an eccentric shaft, and both are connected via a torsion bar. The load-compensating movement is achieved via the torsion bar. The load limiting is effected by spring deflection of the pendulum crosspieces during loading and by the supporting frames and the machine slide coming down with their pressure plates on the machine frame.

SUMMARY OF THE INVENTION

It is an object of the present invention for the absorption of the deformation forces, that occur as a result of closing forces of different magnitude, of the movable tool clamping plate in a simplified manner and for the prevention of jamming of the guide shoes with the guide rail.

In accordance with one embodiment, a bracket-shaped bending element is used which is rigid perpendicularly to the guide rail and has predeterminable elasticity in the axial direction at least in one bending region.

Here, the bending element may be designed as a cast part or also as a welded construction. In both cases, a bending region is provided in the area close to the movable tool clamping plate, this bending region being designed as a material constriction or as a free region of the bracket-shaped bending element intimately connected to the guide shoe.

In one embodiment of the present invention, the bracket-shaped bending elements, in plan view of the movable tool clamping plate, are arranged within the width at the bottom end.

Bearings with internal rollers are provided to connect the guide shoe to the guide rash.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PRESENTLY PREFERRED EMBODIMENTS

Figure 1:
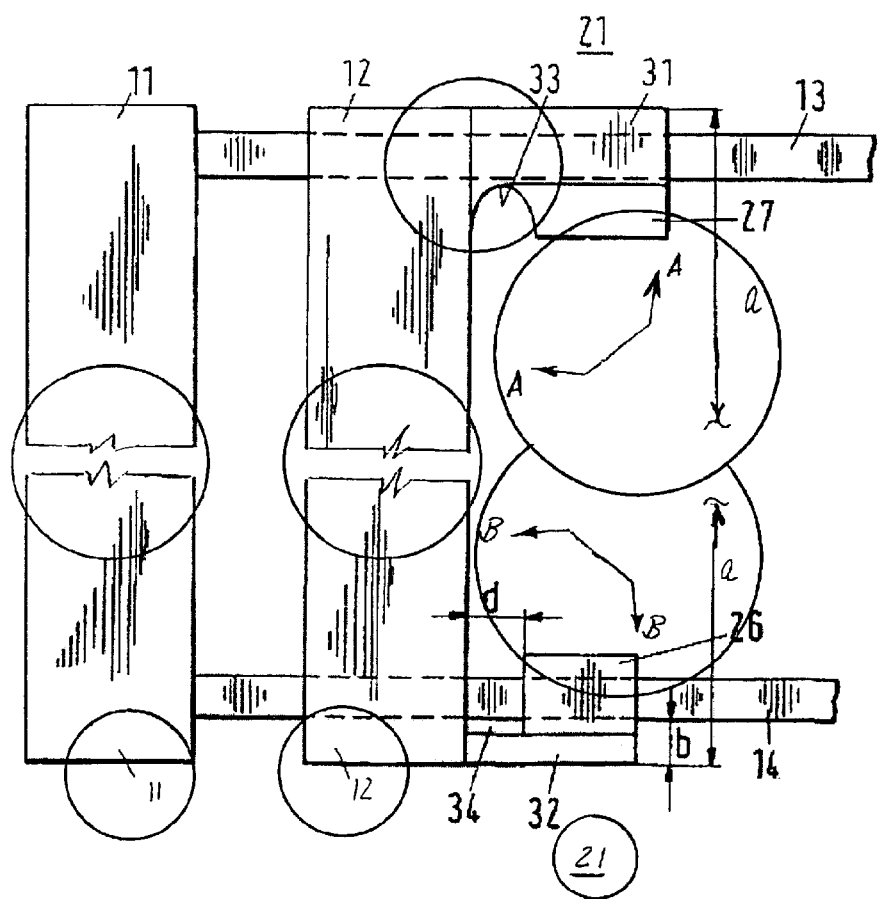
FIG. 1a is a plan view of the movable tool clamping plate of a cast constructed bracket-shaped bending element.
FIG. 1b is a plan view of the movable tool clamping plate of a weld contracted bracket-shaped bending element.

FIGS. 1a and 1b are plan views of the fixed tool clamping plate 11 and of the movable tool clamping plate 12 and also of the rails 13, 14 that are arranged with a machine bed (not shown) and on which the movable tool clamping plate 12 is traversable.

Movable tool clamping plate 12 has a machine slide 21 arranged on the side remote from the fixed tool clamping plate 11.

In FIG. 1a the plan view illustrates a cast construction of the bracket-shaped bending element 31, on which a guide shoe 27 is arranged. A bending region 33 is provided in the area close to the outer wall of the movable tool clamping plate 12.

In FIG. 1b, welded construction of the bracket-shaped bending element 32 is shown. A guide shoe 26 is provided on bending element 32 at a distance d from the movable tool clamping plate 12, in which case a bending region 34 of the bending elements 32 which has the width b is left.

The rails 13 and 14 are arranged in such a way that they are located within the width a of the movable tool clamping plate 12.

Figure 2:
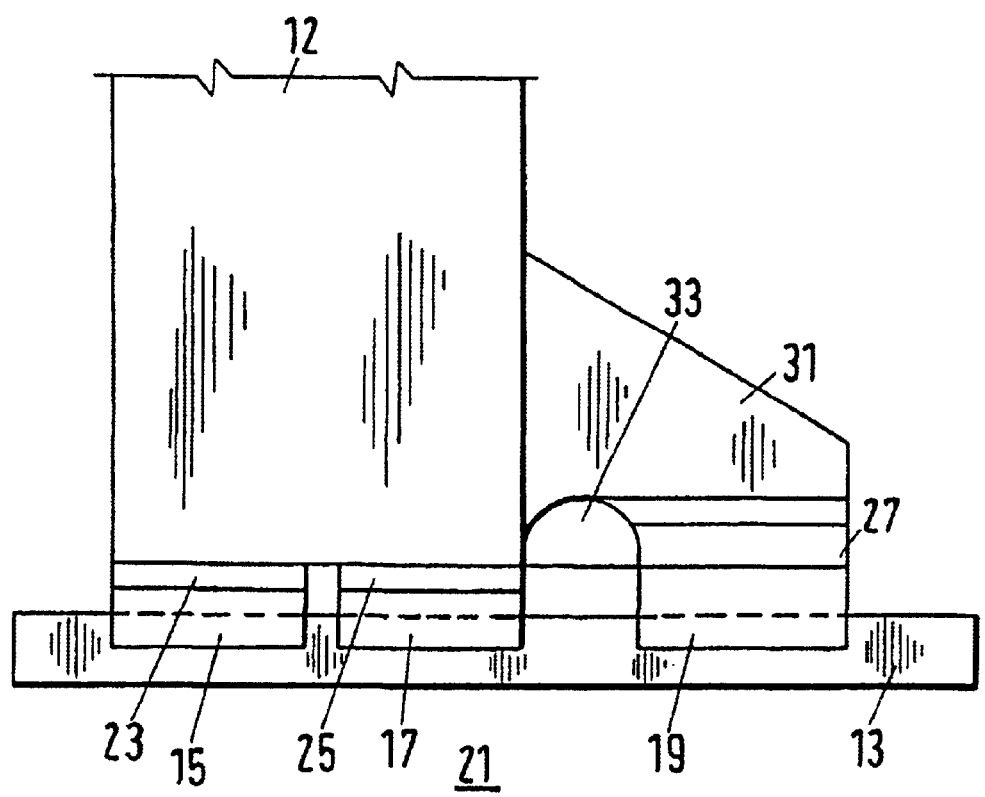
FIG. 2 is a partial elevation view of the movable tool clamping plate.

As illustrated in FIG. 2, the guide shoes 23, 25 are provided at the bottom end of the movable tool clamping plate 12, and the guide shoe 27 is provided on the bracket-shaped bending element 31. Bearings 15, 17 and 19 which correspond with the guide rail 13 are arranged on the guide shoes 23, 25 and 27.

The bearings 15, 17 and 19 are preferably provided with internal rollers.

A bending region 33 is provided on the bracket-shaped bending element 31 such that it directly adjoins the outer wall of the movable tool clamping plate 12.

Figure 3:
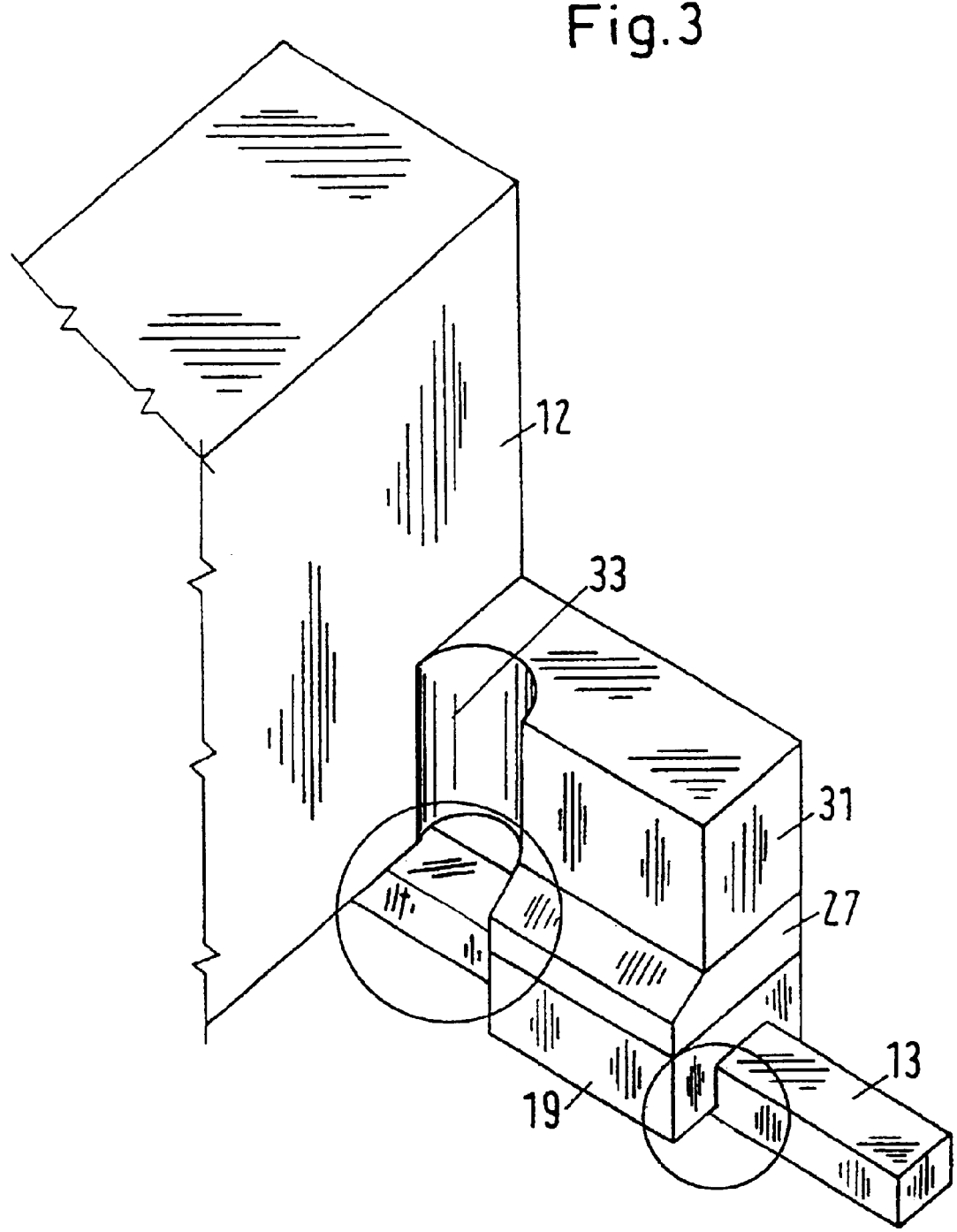
FIG. 3 is a partial perspective view of Section A—A of FIG. 1a wherein a cast construction of the bracket-shaped bending element.

FIG. 3 is a partial perspective view of Section A—A of FIG. 1a. A bracket-shaped bending element 31, as a cast element, is intimately connected to the movable tool clamping plate 12. Provided in the area close to the tool clamping plate 12 is a roughly semicircular indentation 13 which constitutes the bending region 33 of the bracket-shaped bending element 31. Provided outside the bending region 33 is a guide shoe 27, on which a bearing 19 corresponding with the rail 13 is arranged.

Figure 4:
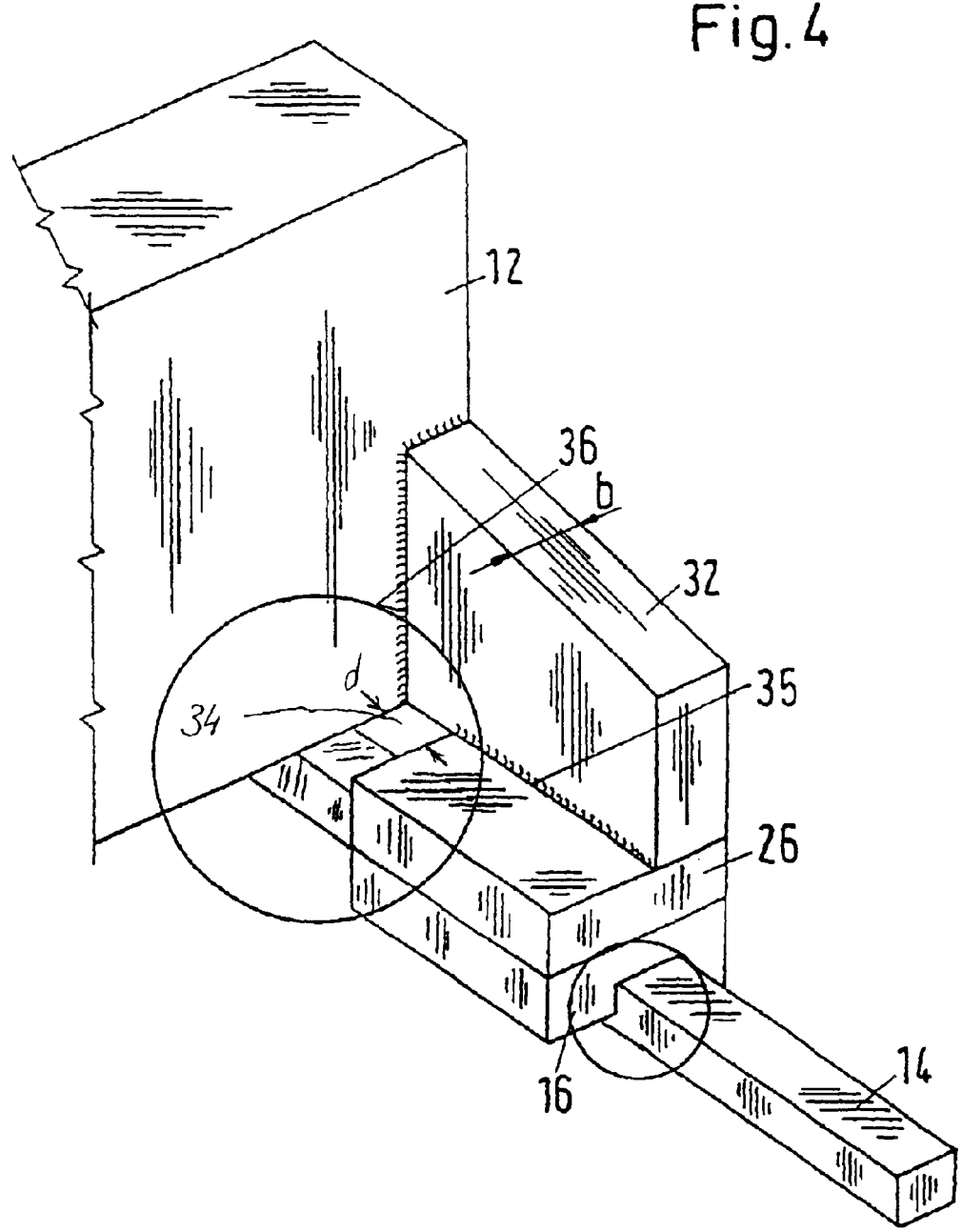
FIG. 4 is a partial perspective view of Section B—B of FIG. 1b wherein welded construction of the bracket-shaped bending element.

FIG. 4 is a partial perspective view of Section B—B of FIG. 1b. A bracket-shaped bending element 32 which is designed as a welded construction element and consists of a plate having the width b. The bracket-shaped bending element 32, which is approximately in the form of a right-angled triangle, is welded with one leg 36 to the movable tool clamping plate 12. Welded to the other leg 35 is a guide shoe 26, to which a bearing 16 which corresponds with a rail 14 is fastened.

The guide shoe 26 is arranged at a distance d, which forms the bending region 34, from the outer wall of the movable tool clamping plate 12. The distance d is preferably selected to be d>2×b.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mold closing device for an injection molding machine for plastics, the mold closing device comprising:

a movable tool clamping plate (12) having a first side opposedly oriented to a fixed tool clamping plate (11) for cooperatively mating tool halves with the fixed tool clamping plate (11) and having a second side distal from the fixed tool clamping plate (11), said movable tool clamping plate (12) mounted on a machine slide connected to a first and a second guide shoe for traversing in an axial direction at least two guide rails (13, 14) associated with a respective edge of said movable tool clamping plate (12);

two bending elements (31, 32), each of said bending elements (31, 32) connecting a corner of the second side of said movable tool clamping plate (12) to one of said guide shoes (13, 14) cooperating with one of the guide rails (13, 14), each bending element (26, 27) being rigid in a direction perpendicular to the respective guide rail (13, 14) and including a bending region (33, 34) having a predeterminable elasticity in an axial direction to absorb a closing force.

2. The mold closing device of claim 1, wherein the movable tool clamping plate (12) further comprises in elevation a bottom end, and in plan an out-to-out width a; and wherein the plural bending elements (31, 32) are arranged within the width a and at the bottom end.

3. The mold closing device of claim 1, further comprising at least one bearing (15, 16) for cooperating with the one of the guide shoes (26, 27); and wherein the at least one bearing (15, 16) is distal from said first side at least by a distance d wherein d>2×b where b is the width of the respective one of said bending elements (31, 32) cooperating with said bearing (15, 16).

4. The mold closing device of claim 1, wherein each of the bending elements (31, 32) is a right-angle triangle, the right-angle triangle including one leg (35) releasably connected to a bearing (15, 16) and the other leg (36) directly connected to said movable tool clamping plate (12).

5. The mold closing device of claim 1, wherein the bending region (33, 34) is a first area of one of said bending elements (31, 32) proximal to said movable tool clamping plate (12) and having a centerline of the first area parallel to said movable tool clamping plate (12), and wherein the cross-section of the first area parallel to said movable tool clamping plate (12) is greater than the cross-section of an area of the respective one of said bending elements (31, 32) more distal from said movable tool clamping plate.

6. The mold closing device of claim 1, wherein said movable tool clamping plate (12) and said bending elements (31, 32) are a unitary cast piece.

7. The mold closing device of claim 1,
   wherein one of said bending elements (31, 32) is a steel plate having a first side welded to one of said guide shoes (26) and a second side welded to said movable tool clamping plate (12).

8. The mold closing device claim 3, wherein said bearing (15, 16) comprises a plurality of internal rollers, and said bearing (15, 16) being connected to said guide shoe (26, 27).

* * * * *

UNITED STATES PATENT AND TRADEMARK OFFICE
CERTIFICATE OF CORRECTION

PATENT NO. : 6,896,508 B2
DATED : May 24, 2005
INVENTOR(S) : Jens Krüger

It is certified that error appears in the above-identified patent and that said Letters Patent is hereby corrected as shown below:

<u>Title page,</u>
Insert Item -- [30]     Foreign Application Priority Data
         October 10, 2000 (DE)            100 50 966.5 --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,896,508 B2  Page 1 of 1
DATED : May 24, 2005
INVENTOR(S) : Jens Krüger It is certified that error appears in the above-identified patent and that said Letters Patent is hereby corrected as shown below:

<u>Title page,</u>
Insert Item -- [30]    Foreign Application Priority Data
           October 10, 2000   (DE)     100 50 966.5
           April 19, 2001     (DE)     101 20 171.5 --.

This certificate supersedes Certificate of Correction issued November 15, 2005.

Signed and Sealed this

Sixteenth Day of May, 2006

JON W. DUDAS
*Director of the United States Patent and Trademark Office*